United States Patent
Ji et al.

(10) Patent No.: US 8,245,822 B2
(45) Date of Patent: Aug. 21, 2012

(54) AMPLITUDE SELECTIVE SHOCK ABSORBER

(75) Inventors: Young Chun Ji, Gyeonggi-do (KR); Kyung Won Park, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 490 days.

(21) Appl. No.: 12/503,550

(22) Filed: Jul. 15, 2009

(65) Prior Publication Data

US 2010/0012451 A1   Jan. 21, 2010

(30) Foreign Application Priority Data

Jul. 16, 2008   (KR) .................. 10-2008-0069251

(51) Int. Cl.
  *F16F 9/34*   (2006.01)
  *F16F 9/00*   (2006.01)

(52) U.S. Cl. ............ 188/322.15; 188/322.13; 188/282.8

(58) Field of Classification Search ............... 188/282.1, 188/282.8, 313, 316, 317, 322.13, 322.15, 188/322.16, 322.18, 322.22

See application file for complete search history.

(56) References Cited

U.S. PATENT DOCUMENTS

| | | | |
|---|---|---|---|
| 2,081,016 A * | 5/1937 | Nibbs | .......................... 464/82 |
| 6,253,889 B1 | 7/2001 | Shirley et al. | |
| 6,352,145 B1 | 3/2002 | DeMolina et al. | |
| 6,389,650 B1 * | 5/2002 | Yamada et al. | ............... 24/20 R |
| 6,460,664 B1 | 10/2002 | Steed et al. | |
| 6,918,473 B2 | 7/2005 | Deferme | |
| 6,981,577 B2 | 1/2006 | Katayama et al. | |

FOREIGN PATENT DOCUMENTS

| | | | |
|---|---|---|---|
| JP | 2304229 A | 12/1990 | |
| JP | 3079831 A | 4/1991 | |
| JP | 4160242 A | 6/1992 | |
| JP | 5248474 A | 9/1993 | |

* cited by examiner

*Primary Examiner* — Melody Burch
(74) *Attorney, Agent, or Firm* — McDermott Will & Emery LLP (57) ABSTRACT

An amplitude selective shock absorber includes a cylinder, a piston rod axially movable within the cylinder, a stationary piston valve fixedly mounted on the piston rod to divide a space of the cylinder into a rebound chamber and a compression chamber, a floating piston valve mounted on the piston rod to be movable in an axial direction in the rebound chamber, a stopper secured to the piston rod above the floating piston valve, and frustoconical leaf springs disposed between the floating piston valve and the stationary piston valve and between the floating piston valve and the stopper, respectively.

6 Claims, 9 Drawing Sheets

AMPLITUDE SELECTIVE SHOCK ABSORBER

BACKGROUND

1. Technical Field

The present disclosure relates to a shock absorber damping vibrations transmitted from a road surface to a vehicle and, more particularly, to an amplitude selective shock absorber that provides a low-damping force characteristic in response to input of high frequency vibrations, which have low amplitudes and occur frequently, thereby enhancing ride comfort of a vehicle.

2. Description of the Related Art

In general, a vehicle is provided with a suspension system for enhancing ride comfort by absorbing or relieving impacts or vibrations transmitted from a road surface to an axle while traveling on the road. One component of the suspension system is a shock absorber. The shock absorber is disposed between the axle and a vehicle body, and includes a cylinder and a piston rod movable in the cylinder. The cylinder is filled with a damping fluid such as gas or oil, which is moved by a piston valve secured to one end of the piston rod to generate a damping force.

As such, a conventional shock absorber has a restriction in that it exhibits predetermined damping force characteristics according to variation of a road state or a driving posture of a vehicle. In other words, a low damping force characteristic can improve driving comfort of the vehicle, but cannot maintain a stable driving posture thereof. Conversely, a high damping force characteristic can maintain the stable driving posture of the vehicle, but entails deterioration in ride comfort. As such, the conventional shock absorber is incapable of controlling damping force characteristics in response to variation of the road state or the driving posture of the vehicle.

In order to solve the problem of such a conventional shock absorber, an amplitude selective shock absorber has been developed to provide variable damping force characteristics according to displacement of the piston rod.

Figure 1:
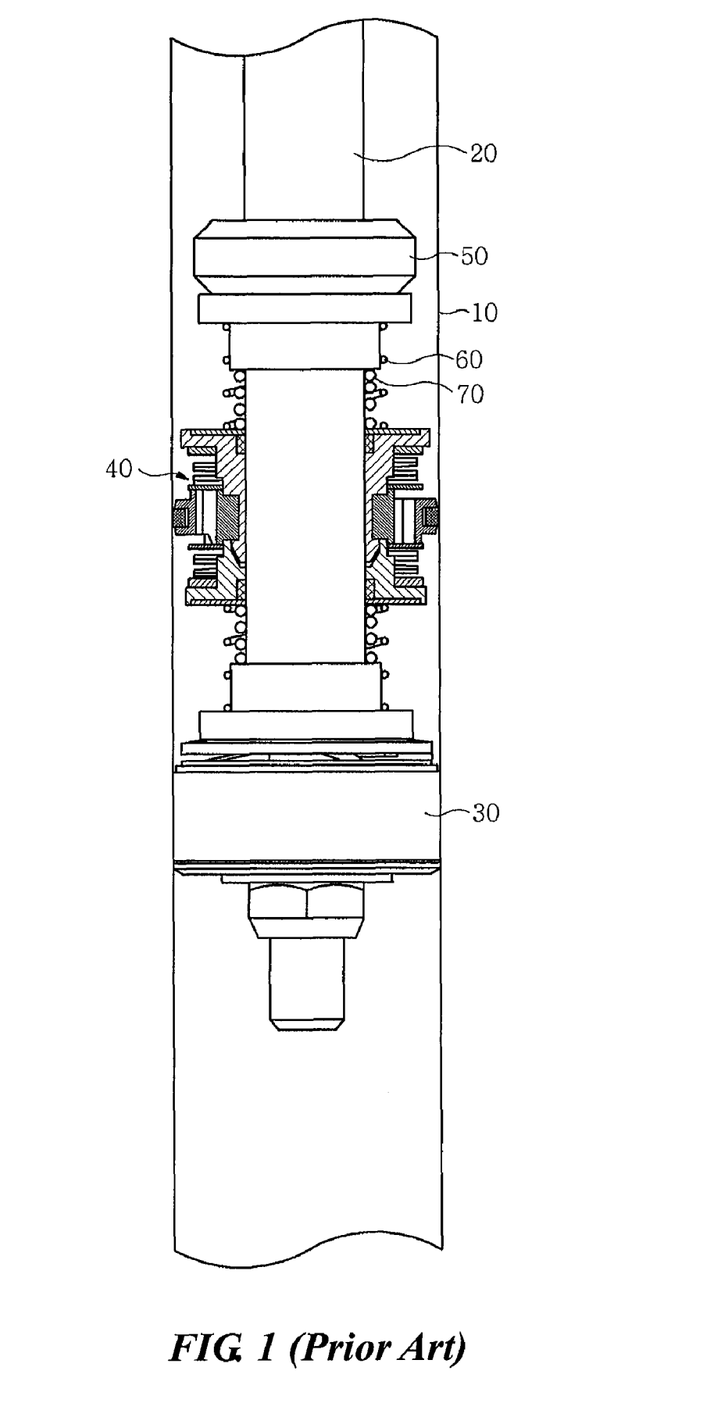
FIG. 1 is a partial cutaway view of a portion of an amplitude selective shock absorber capable of providing variable damping force characteristics according to displacement of a piston rod according to prior art.

FIG. 1 is a cross-sectional view of a portion of a conventional amplitude selective shock absorber capable of providing variable damping force characteristics according to displacement of a piston rod.

Referring to FIG. 1, the existing amplitude selective shock absorber includes a cylinder 10, a piston rod 20 axially movable within the cylinder 10, a stationary piston valve 30 fixedly mounted on the piston rod 20 to divide a space of the cylinder 10 into a rebound chamber and a compression chamber, and a floating piston valve 40 mounted on the piston rod 20 to be movable in an axial direction inside the rebound chamber.

A stopper 50 is secured to the piston rod 20 above the floating piston valve 40. Return spring 60 and stop springs 70 are interposed between the floating piston valve 40 and the stationary piston valve 30 and between the floating piston valve 40 and the stopper 50, respectively.

A length from an upper end of the stationary piston valve 40 to a lower end of the stopper 50 is determined according to a desired design of a final product.

Conventionally, the return springs 60 and the stop springs 70 are disposed between the floating piston valve 40 and the stationary piston valve 30 and between the floating piston valve 40 and the stopper 50. Since the return spring 60 and the stop spring 70 are coil-type springs, they are substantially lengthy. Accordingly, if the length from the upper end of the stationary piston valve 40 to the lower end of the stopper 50 is set small according to a desired design of a final product, the floating piston valve 40 cannot be mounted to the amplitude selective shock absorber.

Figure 2:
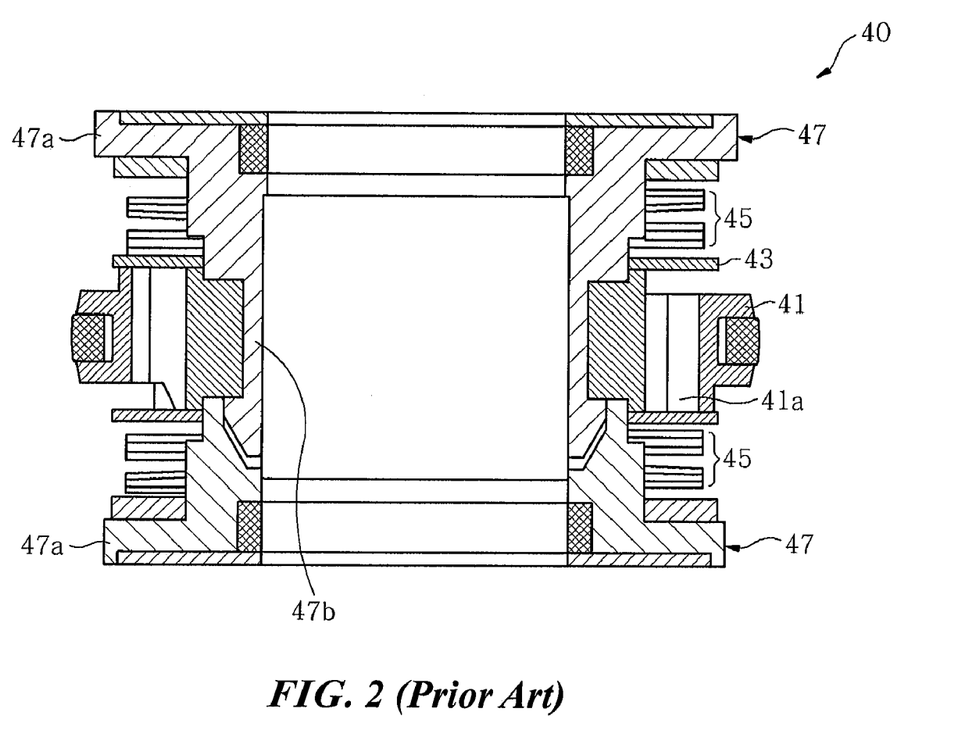
FIG. 2 is a side cross-sectional view of a floating piston valve of the amplitude selective shock absorber of FIG. 1.
Figure 3:
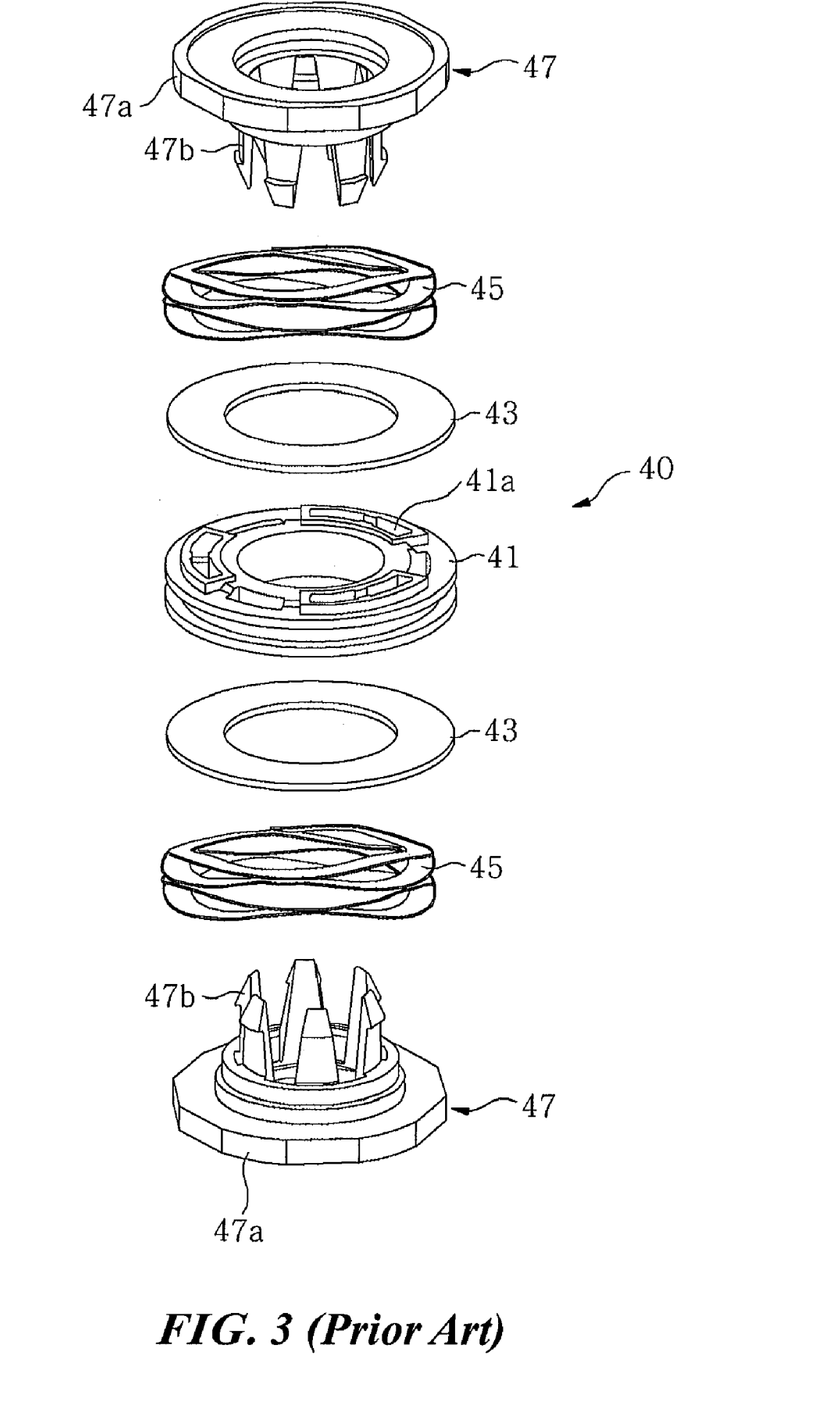
FIG. 3 is an exploded isometric view of the floating piston valve of the amplitude selective shock absorber of FIG. 1.

As clearly shown in FIGS. 2 and 3, in the conventional amplitude selective shock absorber, the floating piston valve 40 includes an annular valve body 41 having fluid passage holes 41a; a pair of upper and lower valve discs 43 mounted on upper and lower sides of the valve body 41 to generate a damping force, respectively; a pair of upper and lower coil-wave type valve springs 45 mounted on upper and lower sides of the upper and lower valve discs 43 to compress the valve discs 43, respectively; and a pair of upper and lower coupling supports 47 coupled to the valve body 41 through an upper side of the upper coil-wave type valve spring 45 and a lower side of the lower coil-wave type valve spring 45 to hold the valve discs 43 and the coil-wave type valve springs 45 between the coupling supports 47 and the valve body 41, respectively.

Conventionally, each of the coupling supports 47 is composed of an annular support section 47a and coupling sections 47b formed on an overall inner edge of the annular support section 47a. When coupled to the valve body 41, the coupling sections 47b are inserted into an inner diameter of the valve body 41 while adjoining the inner diameter of the valve body 41, so that the inner diameter of the valve body 41 inevitably increases corresponding to the thicknesses of the coupling sections 47b of the coupling support 47. Accordingly, an interface between an annular section of the valve body 41 and the annular support section 47a of the coupling support 47 is decreased in area by an increased amount of the inner diameter of the valve body 41, so that the widths of the valve discs 43 are decreased by the increased amount of the inner diameter of the valve body 41. As a result, as valve springs to be disposed between the valve body 41 and the coupling supports 47 to compress the valve discs 43, the conventional floating piston valve employs the coil-wave type valve springs 45 which are expensive and require a narrow mounting area instead of tripod type leaf valve springs which are inexpensive and require a large mounting area.

SUMMARY OF THE INVENTION

According to one embodiment, an amplitude selective shock absorber is configured to mount a floating piston valve even in the case where a length from an upper end of a stationary piston valve to a lower end of a stopper is small.

According to one embodiment, an amplitude selective shock absorber is configured to mount a floating piston valve even in the case where a length from an upper end of a stationary piston valve to a lower end of a stopper is small, while ensuring an area for mounting an inexpensive tripod type leaf valve spring between a valve body and a coupling support.

According to an aspect, there is provided an amplitude selective shock absorber capable of varying damping force characteristics according to displacement of a piston rod. The amplitude selective shock absorber includes a cylinder, a piston rod axially movable within the cylinder, a stationary piston valve fixedly mounted on the piston rod to divide a space of the cylinder into a rebound chamber and a compression chamber, a floating piston valve mounted on the piston rod to be movable in an axial direction in the rebound chamber, and a stopper secured to the piston rod above the floating piston valve. Further, truncated cone-shaped leaf springs are disposed between the floating piston valve and the stationary piston valve and between the floating piston valve and the stopper, respectively, each of the truncated cone-shaped leaf springs having a plurality of through-holes radially formed therein.

DETAILED DESCRIPTION OF THE INVENTION

Hereinafter, example embodiments of the invention will be described with reference to accompanying drawings in FIGS. 4-10.

Figure 4:
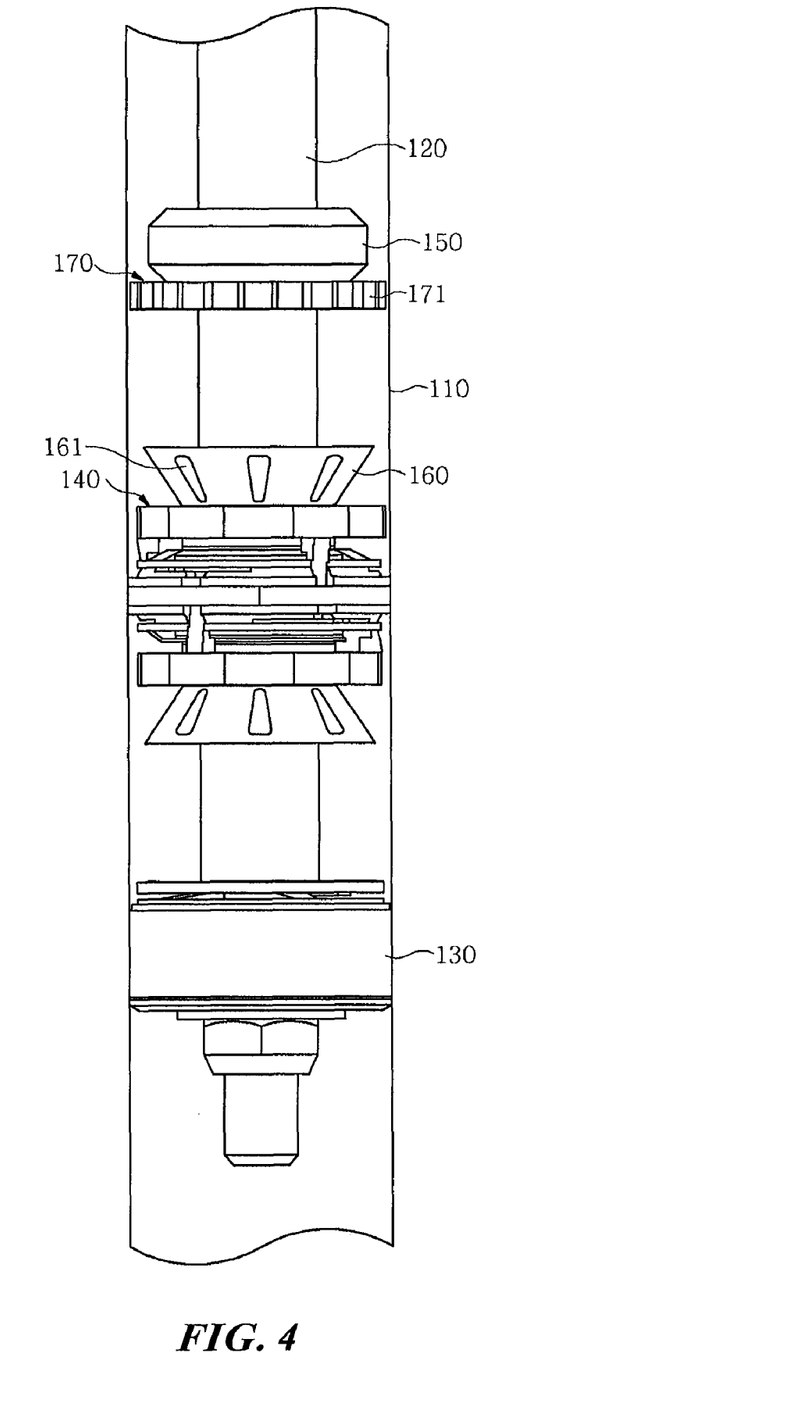
FIG. 4 is a partial cutaway view of a portion of an amplitude selective shock absorber according to one embodiment.

FIG. 4 illustrates a portion of an amplitude selective shock absorber according to one embodiment. As shown therein, the amplitude selective shock absorber includes a cylinder 110, a piston rod 120 axially movable within the cylinder 110, a stationary piston valve 130 fixedly mounted on the piston rod 120 to divide a space of the cylinder 110 into a rebound chamber and a compression chamber, a floating piston valve 140 mounted on the piston rod 120 to be movable in an axial direction inside the compression chamber, and a stopper 150 secured to the piston rod 120 above the floating piston valve 140.

Further, the amplitude selective shock absorber includes truncated cone-shaped or frustoconical leaf springs 160 disposed between the floating piston valve 140 and the stationary piston valve 130 and between the floating piston valve 140 and the stopper 150, respectively. Each of the truncated cone-shaped leaf springs 160 has a plurality of through-holes 161 radially formed therein.

Figure 5:
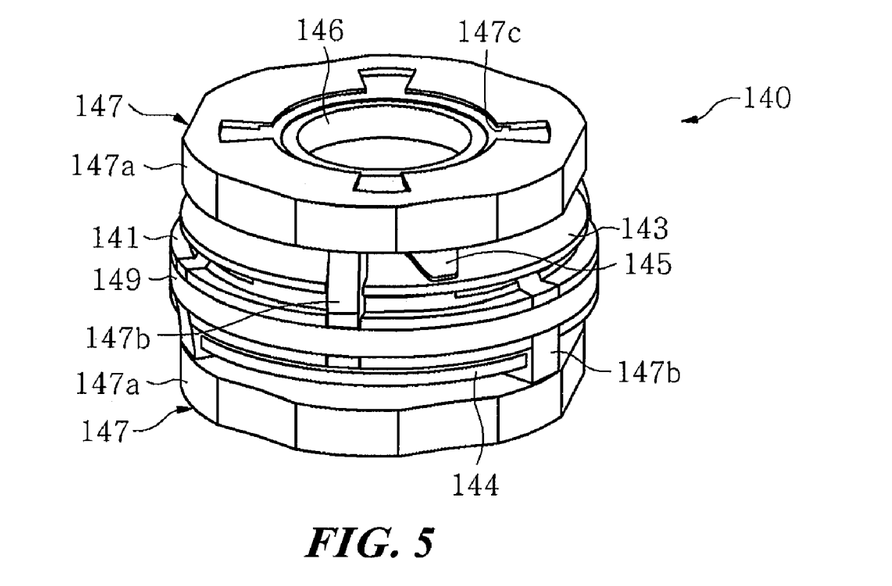
FIG. 5 is an isometric view of a floating piston valve of an amplitude selective shock absorber according to one embodiment.
Figure 6:
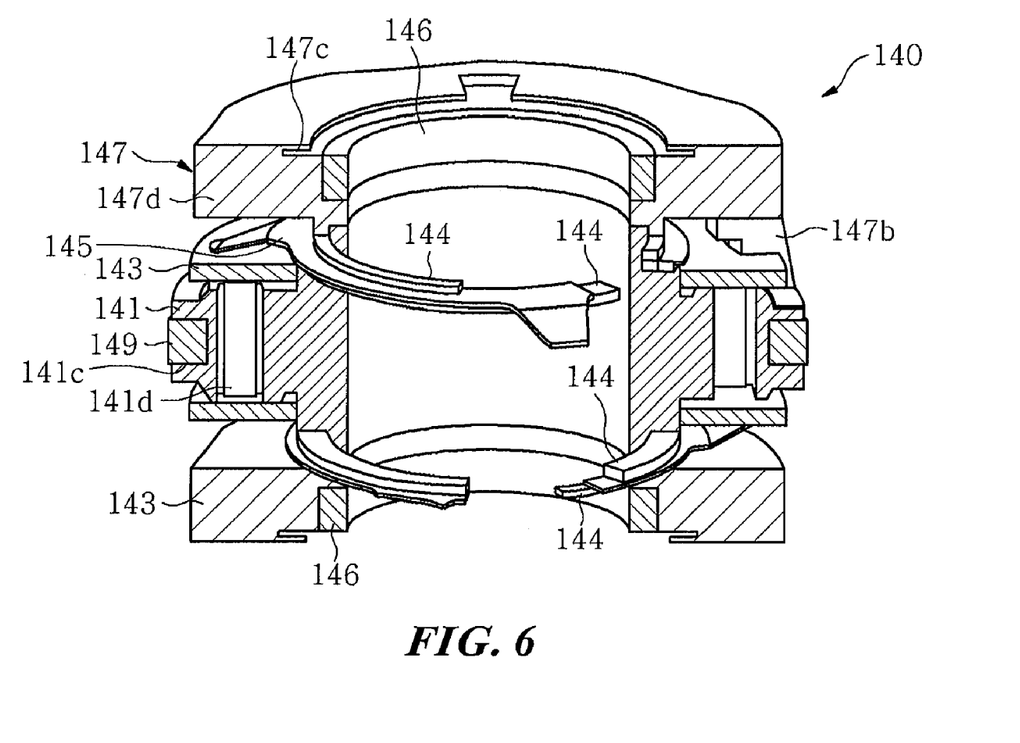
FIG. 6 is a partial cross-sectional isometric view of the floating piston valve of FIG. 5.
Figure 7:
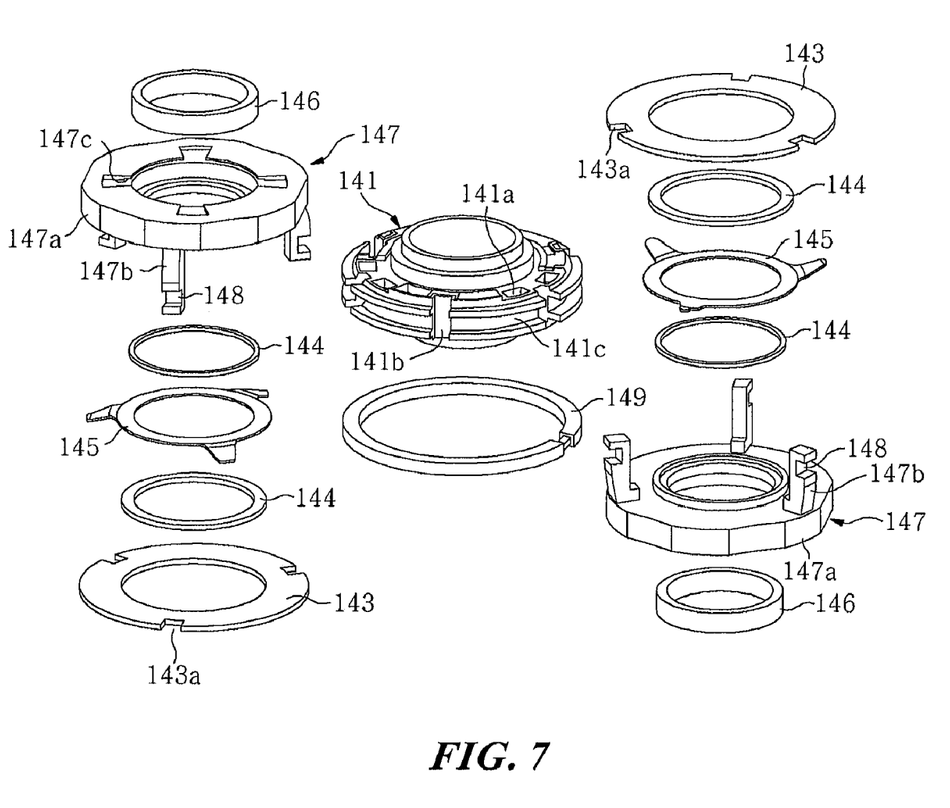
FIG. 7 is an exploded isometric view of the floating piston valve of FIG. 5.

FIG. 5 illustrates a floating piston valve of the amplitude selective shock absorber according to one embodiment, FIG. 6 is a partial cross-sectional view of the floating piston valve of FIG. 5, and FIG. 7 is an exploded view of the floating piston valve of FIG. 5. As shown therein, the floating piston valve 140 includes an annular valve body 141, a pair of upper and lower valve discs 143, a pair of upper and lower tripod type leaf valve springs 145, and a pair of upper and lower coupling supports 147.

The annular valve body 141 is formed with fluid passage holes 141a through which a fluid passes above and below the floating piston valve 140.

The upper and lower valve discs 143 are mounted on upper and lower sides of the valve body 141 to generate a damping force, respectively.

In one embodiment, the upper and lower tripod type leaf valve springs 145 are mounted on an upper side of the upper valve disc 143 and a lower side of the lower valve disc 143 to compress the valve discs 143, respectively.

In one embodiment, the upper and lower coupling supports 147 are coupled to the annular valve body 141 through an upper side of the upper tripod type leaf valve spring 145 and a lower side of the lower tripod type leaf valve spring 145 to hold the valve discs 143 and the tripod type leaf valve springs 145 between the coupling supports 147 and the valve body 141, respectively.

Each of the coupling supports 147 can include an annular support section 147a and coupling sections 147b partially formed on an outer edge of the annular support section 147a.

In one embodiment, the coupling sections 147b are fastened to the valve body 141 through portions of an outer edge of the valve body 141 by a coupling ring 149.

For example, the annular valve body 141 can be formed on an outer peripheral surface thereof with longitudinal insertion grooves 141b for the coupling sections, through which the coupling sections 147b are inserted into and pass, respectively.

Further, each of the valve discs 143 can be formed on an outer peripheral surface thereof with insertion grooves 143a for the coupling sections, through which the coupling sections 147b are inserted into and pass, respectively.

In one embodiment, each of the coupling sections 147b is formed on an outer surface thereof with an insertion groove 148 for the coupling ring, into which the coupling ring 149 is inserted.

In one embodiment, the annular valve body 141 is formed on an outer peripheral surface thereof with an outer peripheral insertion groove 141c for the coupling ring, into which the coupling ring 149 is inserted.

The outer peripheral surface of the coupling ring 149 is in close contact with an inner peripheral surface of the cylinder 110, and a Teflon band (not shown) can be attached to an outer peripheral surface of the coupling ring 149 to allow the stationary piston valve 130 to move up and down with respect to the inner peripheral surface of the cylinder 110 while sealing a gap between the outer peripheral surface of the coupling ring 149 and the inner peripheral surface of the cylinder 110.

Figure 8:
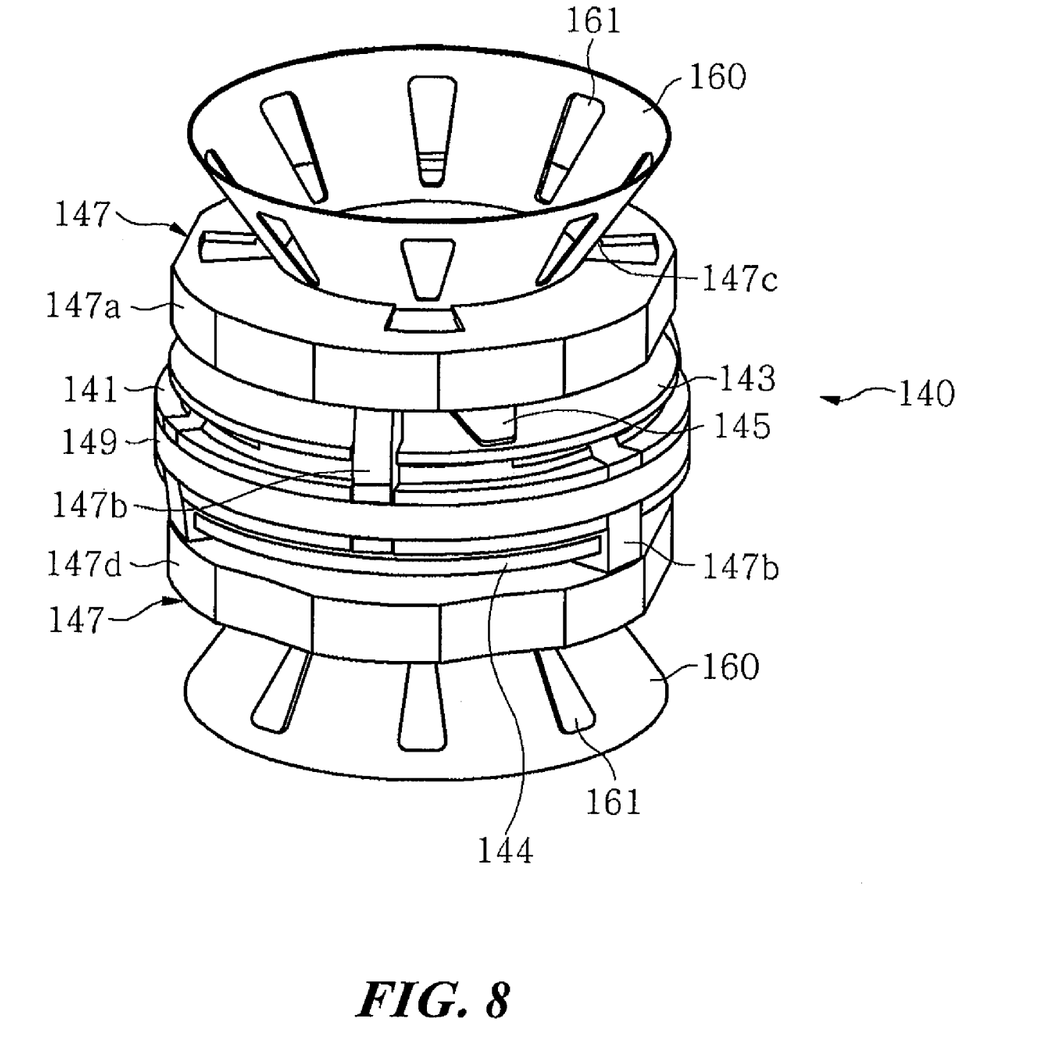
FIG. 8 is an isometric view of an assembly including truncated cone-shaped leaf springs and a floating piston valve according to one embodiment.
Figure 9:
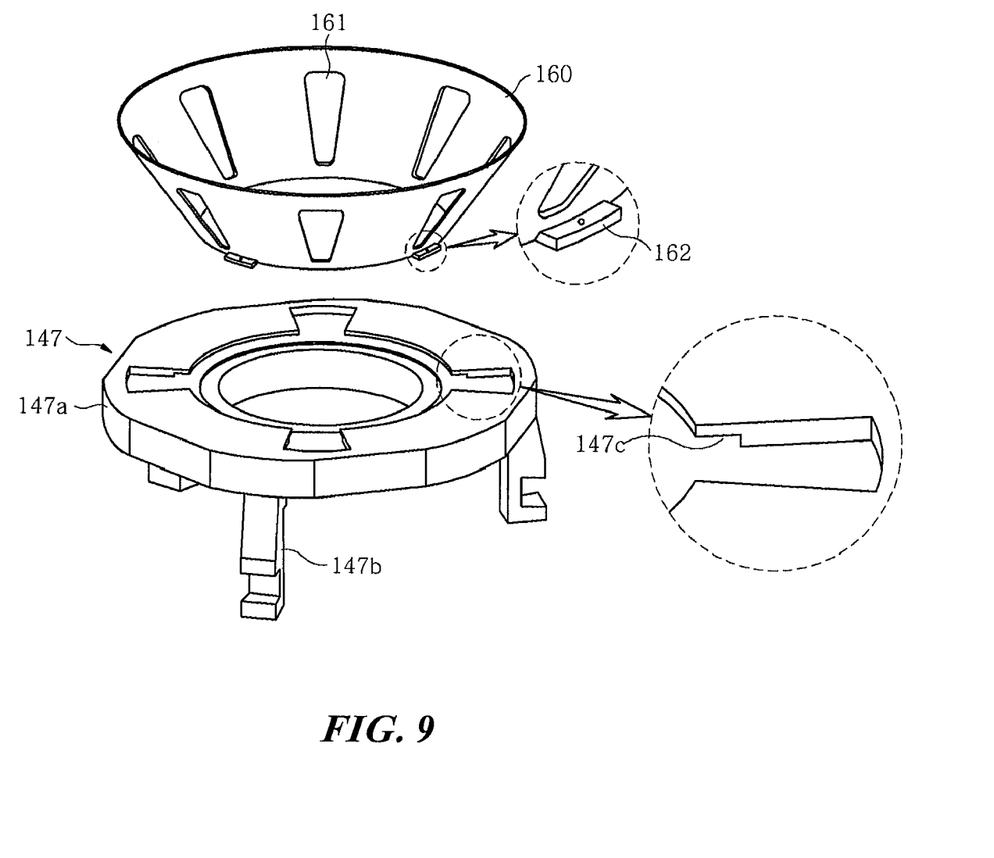
FIG. 9 is a detailed isometric view illustrating a truncated cone-shaped leaf spring and a coupling support separated from each other according to one embodiment.

FIG. 8 is a view illustrating an assembled state of truncated cone-shaped leaf springs assembled to a floating piston valve according to one embodiment, and FIG. 9 is a detailed view illustrating the truncated cone-shaped leaf spring and a coupling support separated from each other according to one embodiment. As shown in FIGS. 8 and 9, the truncated cone-shaped leaf springs 160 can be secured to the pair of upper and lower coupling supports 147 of the floating piston valve 140, respectively, toward a narrower end or region of the truncated cone-shaped leaf springs 160.

In one embodiment, the narrower region of the truncated cone-shaped leaf spring 160 includes fastening pieces 162.

Further, in one embodiment, in each of the upper and lower coupling supports, the annular support section 147a is formed on an outer surface thereof with fastening piece insertion grooves 147c into which the fastening pieces 162 of the truncated cone-shaped leaf spring 160 are inserted and fastened.

Further, as shown in FIG. 4, the stopper 150 includes at a lower end thereof with a support plate 170 which supports or is coupled to a wider end or region of the truncated cone-shaped leaf spring 160, the narrower region of which is secured to the upper coupling support 147 of the floating piston valve 140.

Figure 10:
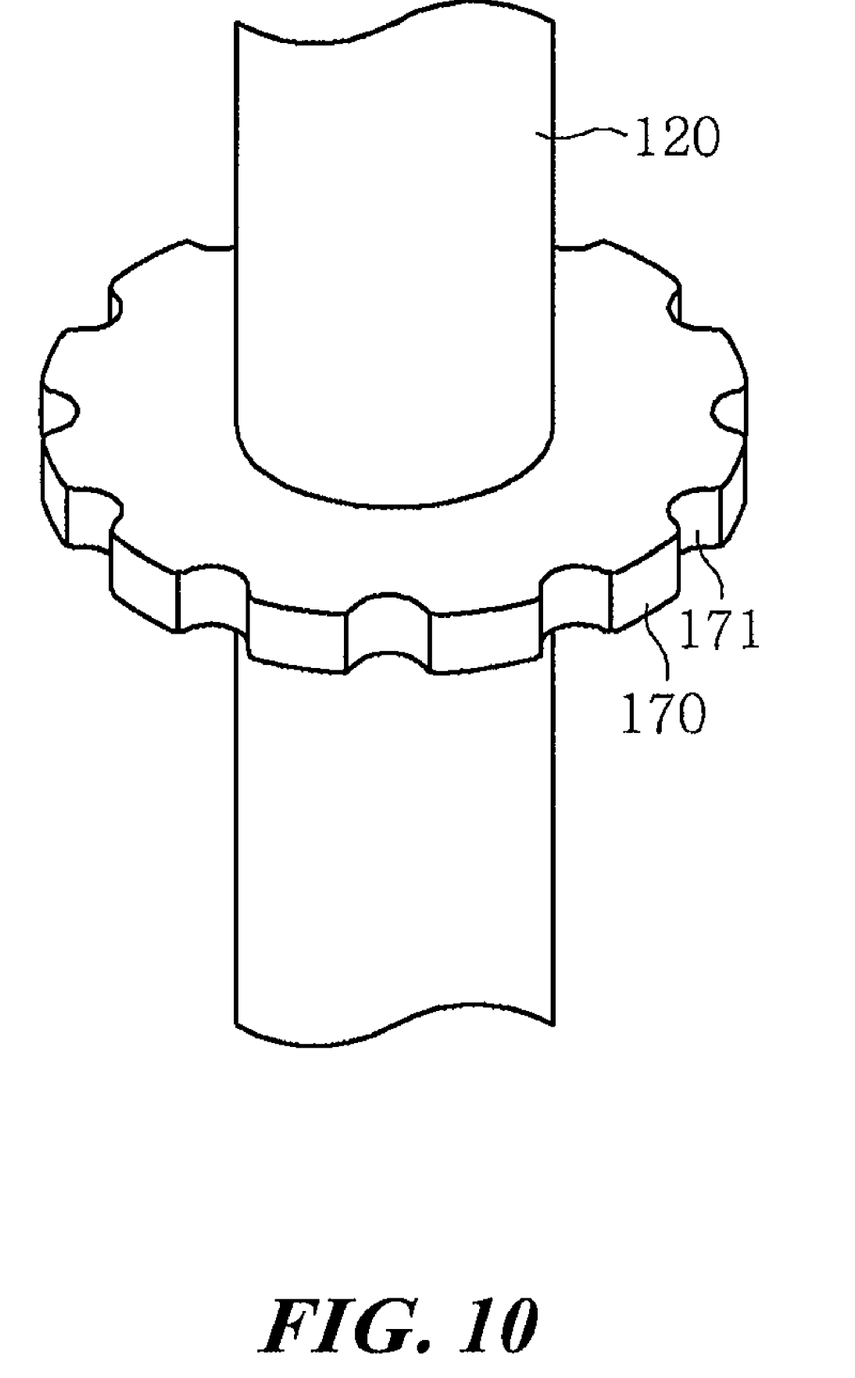
FIG. 10 is a detailed isometric view of a support plate secured to a piston rod according to one embodiment.

FIG. 10 is a detailed perspective view of the support plate secured to the piston rod. As shown in FIG. 10, in one embodiment, the support plate 170 is formed on a periphery thereof with fluid passage grooves 171 through which a fluid passes above and below the support plate 170.

According to one embodiment, the shock absorber employs the truncated cone-shaped, or frustoconical, leaf springs 160 instead of coil springs between the floating piston valve 140 and the stationary piston valve 130 and between the floating piston valve 140 and the stopper 150, respectively, to decrease a length occupied by the truncated cone-shaped leaf springs in the shock absorber, so that the floating piston valve may be mounted in the shock absorber even in the case where a length from an upper end of the stationary piston valve to a lower end of the stopper is small.

Further, according to one embodiment, the coupling sections 147 partially formed on the outer edge of the annular support 147a of the coupling support 147 are fastened to the valve body 141 through portions of the outer edge of the valve body 141, so that the inner diameter of the valve body 141 is neither increased by the thicknesses of the coupling sections 147c of the coupling support 147 nor is the inner diameter of the valve body 141 decreased by the thicknesses of the coupling sections 147c of the coupling support 147. Accordingly, an interface between an annular section of the valve body 141 and the annular support section 147a of the coupling support 147 is not decreased, so that the width of the valve disc 43 is maximized and not decreased. As a result, as a valve spring to be disposed between the valve body 141 and each of the coupling supports 147 to compress the valve disc 143, the floating piston valve may employ the tripod type leaf valve spring which is inexpensive and requires a large mounting area.

Further, in one embodiment, the tripod type leaf valve spring 145 may be provided at upper and lower sides thereof with washers 144 for adjusting the damping force, respectively.

Additionally, in one embodiment, the annular support 147a of the coupling support 147 may be provided therein with a guide ring 146.

As apparent from the above description, according to at least some embodiments of the present invention, a shock absorber employs truncated cone-shaped leaf springs instead of coil springs between a floating piston valve and a stationary piston valve and between the floating piston valve and a stopper, respectively, to decrease a length occupied by the truncated cone-shaped leaf springs in the shock absorber, so that the floating piston valve may be mounted in the shock absorber even in the case where a length from an upper end of the stationary piston valve to a lower end of the stopper is small.

Further, according to at least some embodiments of the present invention, in the amplitude selective shock absorber, the floating piston valve has coupling sections of coupling supports fastened to an annular valve body of the floating piston valve through portions of an outer edge of the valve body to prevent a decrease in width of the valve body and valve discs, so that the floating piston valve can employ tripod type leaf valve springs, which are inexpensive and require large installation areas, as valve springs to be disposed between the valve body and the coupling supports to compress the valve discs.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An amplitude selective shock absorber, comprising:
a cylinder;
a piston rod axially movable within the cylinder;
a stationary piston valve fixedly coupled to the piston rod to divide a space of the cylinder into a rebound chamber and a compression chamber;
a floating piston valve moveably coupled to the piston rod and configured to move in an axial direction in the rebound chamber;
a stopper secured to the piston rod above the floating piston valve; and
first and second frustoconical leaf springs respectively positioned between the floating piston valve and the stationary piston valve and between the floating piston valve and the stopper, each of the frustoconical leaf springs having a plurality of through-holes radially formed therein,
wherein the floating piston valve includes an annular valve body having a fluid passing hole formed therein, a pair of upper and lower valve discs respectively mounted toward upper and lower sides of the valve body to generate damping force, a pair of upper and lower tripod leaf valve springs respectively mounted toward an upper side of the upper valve disc and a lower side of the lower valve disc, configured to compress the valve discs, and a pair of upper and lower coupling supports coupled to the valve body respectively toward an upper side of the upper tripod leaf valve spring and a lower side of the lower tripod leaf valve spring, configured to hold the valve discs and the tripod leaf valve springs between the coupling supports and the valve body, each of the coupling supports including an annular support section and a coupling section partially formed on an outer edge of the annular support section and being fastened to the valve body through a portion of an outer edge of the valve body, and
respective narrower regions of the frustoconical leaf springs are respectively secured to the upper and lower coupling supports of the floating piston valve, a support plate being coupled to a lower end of the stopper, the support plate supporting a wider region of a corresponding frustoconical leaf spring.

2. The amplitude selective shock absorber of claim 1 wherein a fluid passage groove, through which a fluid passes above and below the support plate, is formed on a periphery of the support plate.

3. The amplitude selective shock absorber of claim 1 wherein the narrower region of each frustoconical leaf spring is formed with a fastening piece, and a fastening piece insertion groove is formed on an outer surface of the annular support section in each of the upper and lower coupling supports, the fastening piece of the frustoconical leaf spring configured to be coupled to the fastening piece insertion groove.

4. The amplitude selective shock absorber of claim 1, further comprising: a coupling ring configured to couple the respective coupling sections to the valve body.

5. The amplitude selective shock absorber of claim 4 wherein an outer peripheral surface of the annular valve body includes a longitudinal insertion groove configured to receive the respective coupling sections, an outer peripheral surface of the valve discs includes an insertion groove configured to receive the respective coupling sections, an outer surface of the coupling sections includes an insertion groove configured to receive the coupling ring, and an outer peripheral surface of the annular valve body includes an outer peripheral insertion groove configured to receive the coupling ring.

6. An amplitude selective shock absorber, comprising:
a cylinder;
a piston rod axially movable within the cylinder;
a stationary piston valve fixedly coupled to the piston rod to divide a space of the cylinder into a rebound chamber and a compression chamber;
a floating piston valve moveably coupled to the piston rod and configured to move in an axial direction in the rebound chamber;
a stopper secured to the piston rod above the floating piston valve; and
first and second frustoconical leaf springs respectively positioned between the floating piston valve and the stationary piston valve and between the floating piston valve and the stopper, each of the frustoconical leaf springs having a plurality of through-holes radially formed therein, wherein the floating piston valve includes an annular valve body having a fluid passing hole formed therein, a pair of upper and lower valve discs respectively mounted toward upper and lower sides of the valve body to generate damping force, a pair of upper and lower tripod leaf valve springs respectively mounted toward an upper side of the upper valve disc and a lower side of the lower valve disc, configured to compress the valve discs, and a pair of upper and lower coupling supports coupled to the valve body respectively toward an upper side of the upper tripod leaf valve spring and a lower side of the lower tripod leaf valve spring, configured to hold the valve discs and the tripod leaf valve springs between the coupling supports and the valve body, each of the coupling supports including an annular support section and a coupling section partially formed on an outer edge of the annular support section and being fastened to the valve body through a portion of an outer edge of the valve body, said amplitude selective shock absorber further comprises a coupling ring configured to couple the respective coupling sections to the valve body, and an outer peripheral surface of the annular valve body includes a longitudinal insertion groove configured to receive the respective coupling sections, an outer peripheral surface of the valve discs includes an insertion groove configured to receive the respective coupling sections, an outer surface of the coupling sections includes an insertion groove configured to receive the coupling ring, and an outer peripheral surface of the annular valve body includes an outer peripheral insertion groove configured to receive the coupling ring.

* * * * *